Dec. 20, 1960
F. A. GAUDING
2,964,877
GROWING PLANT SUPPORT
Filed Oct. 16, 1958
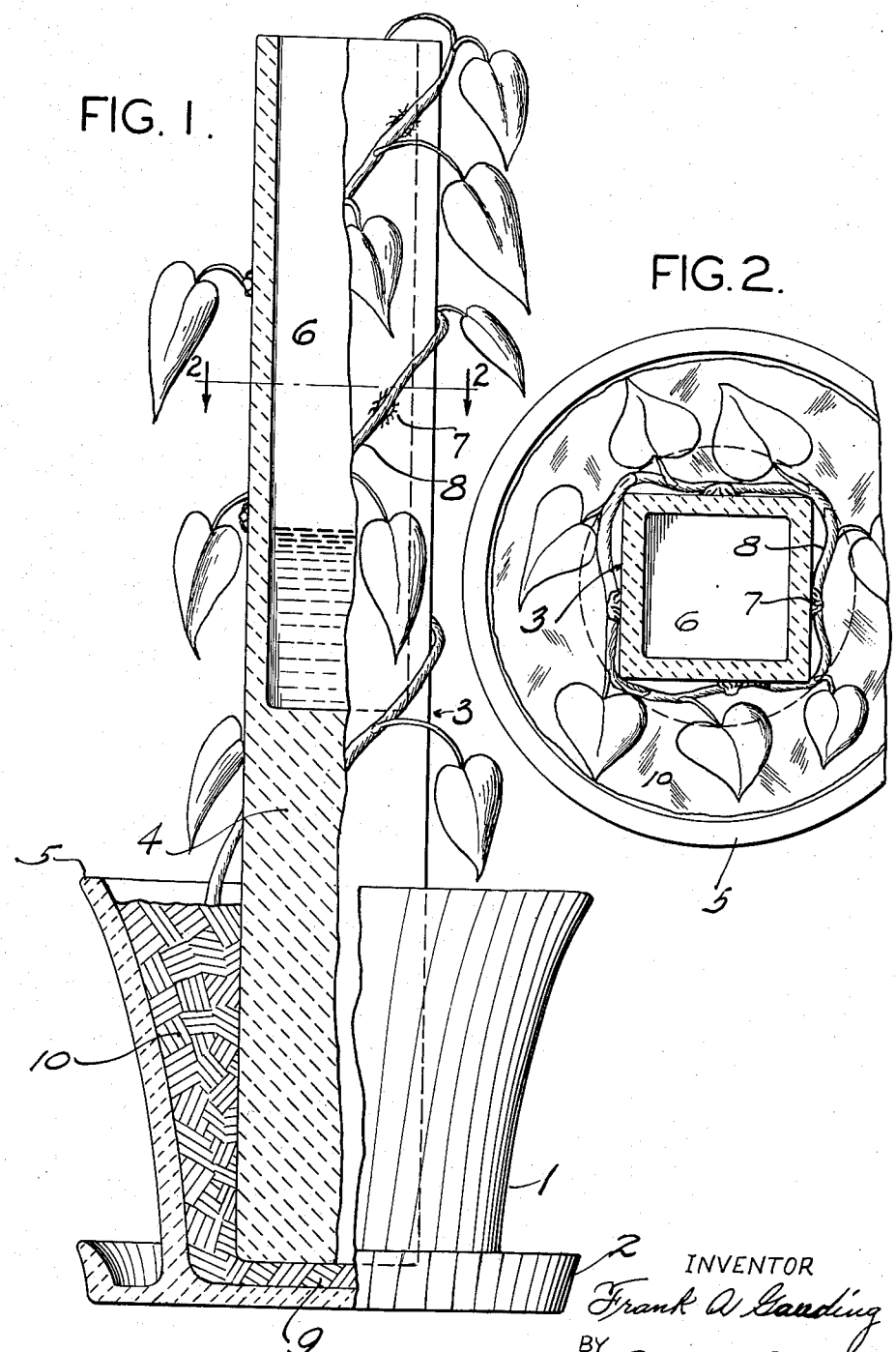
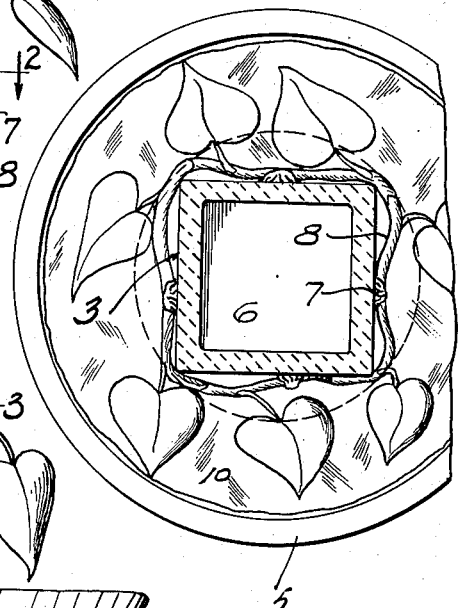
INVENTOR
Frank A. Gauding
BY Rodney Bedell
ATTORNEY.

United States Patent Office 2,964,877
Patented Dec. 20, 1960

2,964,877

GROWING PLANT SUPPORT

Frank A. Gauding, 4633 Delor St., St. Louis, Mo., assignor of one-half to Rowena Gauding, St. Louis, Mo.

Filed Oct. 16, 1958, Ser. No. 767,679

1 Claim. (Cl. 47—38)

The invention relates to the growing of decorative house plants and more particularly to the container and associated support for a vine such as the familiar philodendron. It has long been the practice to grow philodendron in containers and permit them to hang down or to be looped downwardly from the container according to the length of the vine. Recently it has been a common practice to place an upstanding pole, formed of compressed bark or other fibrous material, in the pot and to twine the vine around the pole. By watering the pole at intervals, there is afforded a moisture dispenser to which the roots of the vine cling and the vine thrives accordingly. Such poles are susceptible to rapidly losing their moisture and drying out if not wet frequently. It is difficult to wet the pole substantially throughout its length without spilling water where it is not wanted, indeed, it is common practice to set the pot in a bathtub or sink when it is necessary to water the pole and the watering operation usually soaks the earth in the pot, as well as the pole, which is undesirable as the earth should be watered only when it is dry, and the earth should not be kept as moist as is desirable for the pole. If the pole is kept moist, it is subject to rotting around the base and becoming soft and soggy at other points and weakening until it collapses and the ensemble is destroyed, as it is difficult or impossible to separate the vine from the pole and substitute a new pole.

The object of the invention is to improve upon the growing of philodendron on a pole as outlined above, and this object is attained by provision of a pole formed of porous clay with a hollow forming a water reservoir, the clay being unglazed to permit the penetration of water from the interior to the exterior, where the vine roots may absorb the moisture.

The invention is illustrated in the accompanying drawings, in which:

Figure 1 is in part a side elevation and in part a vertical section through a pot and pole with a vine rooted in the earth in the pot.

Figure 2 is a horizontal section on line 2—2 of Figure 1.

The pot 1 is of familiar type which may include an integral saucer 2. The pole 3 is shown as of rectangular contour and the lower portion 4 of the pole is solid for a height preferably a substantial distance above the pot rim 5. The upper portion 6 of the pole is hollow to form a reservoir for water. The total height of the pole may vary but generally will be at least three times the height of the pot. The pole is formed of natural porous clay which is unglazed and unpainted so that moisture can penetrate from the water reservoir to the exterior surface, which it will nourish the eye rootlets 7 of the vine 8, here shown as a philodendron. The bottom of the pole is flat and may rest upon the bottom of the pot or the pole may rest upon a layer of earth, or sand or gravel 9 in the bottom of the pot, and be stabilized by earth 10 with which the pot is substantially filled.

Water may be poured into the open top of the hollow pole readily and without attempting to moisten the exterior face of the pole. Due to the natural phenomenon of unglazed clay darkening when wet, the color of the pole will always indicate the need for water. When the pole is light in color, water should be added. If the pole is dark in color, water is unnecessary. The earth in the pot may be watered separately from the pole and should be watered only when the top of the soil is dry. By making the pole solid to above the level of the earth, the degree of moisture in the earth can be controlled and the soil will not become wet and sour. By adding liquid fertilizer to the water, the eye rootlets 7 may be supplied with nourishment as well as the main roots in the earth.

Being made of clay, the pole will never rot, become soft and soggy and crumble, and will last indefinitely. It will be unnecessary for the user to move the pot to a bathtub or sink to avoid inconvenience when water is to be added.

The pole may be given different contours from the rectangular shape shown, and ridged or otherwise ornamented and varied in diameter and height as may be desired and other variations may be made in the pole and its assembly in the pot without departing from the spirit of the invention and the exclusive use of those modifications coming within the scope of the claim is contemplated.

I claim:

A planter comprising a pot for earth and an elongated upright standard of substantially uniform diameter and extending from the bottom of the pot upwardly and consisting of porous unglazed clay projecting upwardly above the rim of said pot, the lower portion of said standard being substantially solid throughout the height of the pot and the standard being hollow above said solid section and forming a water reservoir.

References Cited in the file of this patent

UNITED STATES PATENTS

| | | |
|---|---|---|
| 796,214 | Hughes | Aug. 1, 1905 |
| 1,654,042 | Leffland | Dec. 27, 1927 |
| 1,904,287 | Leffland | Apr. 18, 1933 |
| 2,383,665 | Malicay | Aug. 28, 1945 |

FOREIGN PATENTS

| | | |
|---|---|---|
| 577,276 | France | June 2, 1924 |
| 1,055,487 | France | Oct. 14, 1953 |